United States Patent [19]

Dilling et al.

[11] Patent Number: 4,892,587

[45] Date of Patent: Jan. 9, 1990

[54] LIGNOSULFONATE ADDITIVE-CONTAINING CARBON BLACK COMPOSITIONS

[75] Inventors: Peter Dilling, Isle of Palms; Gerald Prazak, Charleston; Catherine C. Cashman, Hanahan, all of S.C.

[73] Assignee: Westvaco Corporation, New York, N.Y.

[21] Appl. No.: 261,156

[22] Filed: Oct. 24, 1988

[51] Int. Cl.$^4$ .............................................. C08L 97/02
[52] U.S. Cl. .................................. 106/123.1; 530/501
[58] Field of Search .............................. 530/500, 501; 106/123.1, 130; 8/524

[56] References Cited

U.S. PATENT DOCUMENTS 2,525,433  10/1950  Voet ........................................ 106/30
4,590,262   5/1986  Dilling ..................................... 530/501

Primary Examiner—Theodore Morris
Attorney, Agent, or Firm—Terry B. McDaniel; Richard L. Schmalz

[57] ABSTRACT

A carbon black composition comprising carbon black and a lignin dispersant prepared by the steps of methylolating a lignin compound by reaction of less than about 2 moles formaldehyde per 1,000 grams of the lignin, and sulfonating the methylolated lignin by reaction from about 2.5 to 3.5 moles of the sulfite or bisulfite compound per 1,000 grams of lignin at an initial reaction pH of below about 6.6 and at a temperature of at least about 170° C., while allowing the pH of the reaction mixture to rise to a final pH of greater than 7.5 to sequentially sulfomethylate the aromatic nucleus and sulfonate the side chain of the lignin.

4 Claims, No Drawings

LIGNOSULFONATE ADDITIVE-CONTAINING CARBON BLACK COMPOSITIONS

The present invention is directed to employing a sulfonated lignin for use as an additive in chemical compositions and processes, and, more particularly, to such sulfonated lignin products suited for use as a dispersant, especially in carbon black compositions, to provide lower viscosities and improved shelf life for such compositions.

BACKGROUND OF THE INVENTION

Lignin products are widely employed as additives in various chemical processes and compositions. Lignin is a complex, high-molecular weight polymer occurring naturally in close association with cellulose in plants and trees. In the paper-making industry, lignin may be recovered as a by-product of the cellulose product by two principal wood-pulping processes known as the sulfite process and the kraft process. In the sulfite process, lignin is solubilized from the cellulosic portion of the wood pulp by direct sulfonation, while the kraft process is based on an alkaline degradation mechanism causing cleavage of $\beta$-aryl ether linkages in the polymeric lignin which sequentially result in chemical functions of the phenolic and carboxylic type. Kraft process lignin generally is isolated by acid precipitation from the black liquor of the pulping process at a pH below the pKa of the phenolic groups.

Depending on conditions under which a kraft lignin is precipitated, the lignin may be either in the form of a free acid lignin or a lignin salt. If the lignin is precipitated at a high pH, such as about 9.5 to 10, the lignin is obtained in the form of a salt. If this lignin is further processed by washing, acidifying to a low pH, and further washed to be substantially free of salt and ash-forming ingredients, free acid lignin, known as "A" lignin, is obtained.

The high degree of chemical activity characteristic of lignin permits the preparation of many organic derivatives. Lignin by-products variously are employed in other chemical compositions as a surfactant, extender, dispersant, reinforcement, absorbent, binder, sequestering agent, emulsifier, emulsion stabilizer, and stabilizing and protective colloid. Lignosulfonate compounds, particularly sodium salts of lignosulfonates, are widely employed as additives and dispersants in textile dyestuffs and printing pigments, and sodium salt sulfonated lignin by-products have been sold for many years under the trademarks Polyfon ® and REAX ® by Westvaco Corporation of North Charleston, S.C.

Dilling U. S. Pat. No. 4,590,262 owned by Westvaco Corporation discloses an improved method of producing sodium salts of low electrolyte-containing lignosulfonates suited for use as dye and print paste additives comprising the steps of ionizing the phenol component of the lignin material in an alkaline liquid medium, methylolating the ionized phenol component of the lignin by addition of an aldehyde, such as formaldehyde, lowering the pH of the liquid medium to an acid pH to precipitate the methylolated lignin material, washing the precipitated lignin material with water to remove inorganic salts and residual reactants therefrom, and subsequently sulfonating the washed purified methylolated lignin material with a sodium salt of a sulfur-oxygen-containing compound, such as sodium bisulfite.

Under processing conditions described in U.S. Pat. No. 4,590,262, using the molar amounts of formaldehyde and the sodium-oxygen-containing compound (sodium bisulfite) described, sulfonation of the lignin occurs at the methylolation site on the aromatic phenolic ring of the lignin molecule, which is referred to as sulfomethylation of the lignin. As stated, the sulfomethylation reaction preferably is conducted at atmospheric pressure and at a temperature at around 80°–100° C., although elevated pressures and temperatures above to about 190.C., may be employed.

U.S. Pat. No. 4,590,262 also discloses that it is possible to sulfonate the lignin side chain of the aromatic nucleus by sodium sulfite treatment in the absence of formaldehyde. Low sulfonated lignin products of the invention of U.S. Pat. No. 4,590,262, i.e., sodium salts of sulfomethylated lignins having a degree of organically bound sulfonation of about 1 mole or less per 1,000 grams of lignin may be produced, and higher sulfomethylated lignin products, i.e., having a sulfomethylation of greater than about 1.6 moles per 1,000 grams of lignin, may also be produced.

OBJECTS OF THE PRESENT INVENTION

It is an object of the present invention to provide a sulfonated lignin for use as an additive in chemical processes and compositions which is prepared under controlled processing conditions to sulfomethylate the phenolic nucleus and sulfonate the lignin side chain of the lignin molecule.

It is another object to provide an improved method of producing sulfonated lignin products particularly suited for use as dispersants and additives in dyestuffs, such as disperse and vat dyestuffs, to produce lower viscosity dyestuff formulations having improved grinding and shelf life properties.

It is another object to provide an improved method of producing sulfonated lignins having utility as a dispersant in carbon black compositions and exhibiting lower viscosity suited for use in grinding operations with the carbon black and during carbon black storage of disperse liquid carbon black systems.

It is a further object to provide an improved dyestuff composition containing as a dispersant therein the sulfonated lignin products of the present invention.

It is still another object to provide an improved carbon black composition having as a dispersant therein the sulfonated lignin products of the present invention.

BRIEF SUMMARY OF THE INVENTION

The product of the present invention is produced by methylolation and sulfonation of a lignin composition. The reaction is controlled to allow the pH during sulfonation at elevated temperature to drift from slightly acidic to slightly alkaline during which time sequential sulfomethylation of the phenolic nucleus and sulfonation of the lignin side chain of the lignin molecule occurs. More specifically, a lignin, as may be recovered from the black liquor of a kraft paper-making process, is methylolated in aqueous medium at an alkaline pH, e. g., 9.5–12, by reaction with no more than about 2 moles formaldehyde per 1,000 grams of lignin, the methylolated lignin is acidified to an acid pH, e.g., a pH of about 5.5, and the methylolated lignin is sulfonated by reaction with from about 2.5 to 3.5 moles of a sulfite or bisulfite compound per 1000 grams of lignin at an initial reaction pH of below about 6.6 and at a reaction temperature of greater than about 170° C. to obtain a final reaction product having pH of greater than about 7.5.

For lowest viscosities and extended shelf-life in dye compositions incorporating the lignin products of the present invention, it has been found that methylolation with from about 1.4 to 1.7 moles formaldehyde and sulfonation with from about 2.7 to 2.9 moles sulfite or bisulfite compound per 1000 grams of lignin is preferred.

The sulfonated lignin products of the present invention exhibit improved properties over those lignin products identified in prior U.S. Pat. No. 4,590,262, particularly with respect to its lower viscosity performance as a dispersant in disperse and vat dyestuff compositions, as well as a dispersant in carbon black compositions. As a dispersant in the dyestuff compositions, shelf life of the dyestuff compositions is improved. By maintaining a medium to high degree of sulfonation in the lignin (1.5-2 moles sulfur per 1,000 grams lignin organically bound therein), viscosity stability during extended dye liquid storage is improved. Dyestuff composition viscosities of less than about 100 cps can be achieved after extended storage periods.

DETAILED DESCRIPTION OF PREFERRED EMBODIMENTS

The improved sulfonated lignin salts of the present invention may be prepared in one manner in accordance with the following laboratory procedures.

A known amount of solid lignin recovered from the black liquor of a kraft paper-making process in "A" lignin form is slurried to a 25% total solids content and the pH of the slurry adjusted to 11 with addition of 50% solution of sodium hydroxide. The temperature of the slurry is raised to 65°–70° C., and less than about two moles of formaldehyde are added to the slurry for reaction for two hours to methylolate the lignin. The resulting methylolated lignin slurry is acidified to a pH of about 5.5 by addition of sulfur dioxide gas ($SO_2$) resulting in a reaction creating approximately 1.9 moles of sodium bisulfite per 1,000 grams of the lignin. An additional amount of sodium sulfite or sodium bisulfite is added to the slurry, with pH adjustment with a small amount of sodium hydroxide, to obtain a pH of 6.3 and a total sulfite/bisulfite concentration of approximately 2.5–3.5 moles per 1,000 grams of the methylolated lignin.

The methylolated lignin slurry containing the reactive sulfonation ingredients is heated at a temperature of above about 170° C., preferably 175° C., for ½ to 4 hours to sequentially sulfomethylate the phenolic nucleus of the lignin and sulfonate the lignin side chain of the lignin molecule as the pH of the reaction rises to obtain a final lignin composition pH of greater than about 7.5.

The reaction occurring during the method of the present invention may be expressed by the following chemical equation:

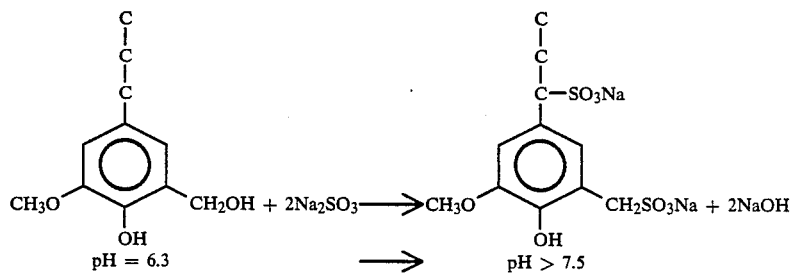

A number of sulfonated lignin salts prepared from various "A" lignin kraft process by-products by the method of the present invention were combined as dispersants in disperse dye and vat dye formulations and tested for heat stability and dye storage performance. Heat stability and dye storage performance of the dye formulations containing lignin dispersants of the present invention were compared with dye formulations containing lignosulfonate salt dispersants prepared in accordance with the teachings of U.S. Pat. No. 4,590,262 (prior art).

To obtain heat stability measurements, dye/lignin compositions were prepared from the lignin products of the prior art and the present invention. Compositions containing 50 grams of dyestuff, 35 grams of the particular sulfomethylated lignin, 125 milliliters of water, and 5 drops of ethylenediaminetetraacetic acid (1% solids at pH 10.0–10.5) were adjusted to pH 8.0 with acetic acid. Each dye composition containing a lignin additive was ground in a ball mill to the point where the filter test for disperse dyes was passed. To 1 gram of each solid dye composition was added 250 milliliters of water, the pH adjusted to 5.0 with sulfuric acid after which the solution was boiled for fifteen minutes, and then filtered through a tared Whatman filter paper no. 2 above a no. 4 paper (with vacuum). This test is an adaptation of the standard American Association of Textile Chemists and Colorists (AATCC) heat stability test. The filter paper was dried, and the residual dye material remaining on the filter was calculated by weight and visually observed.

TABLE I

The Effect of Reaction pH During Dispersant Processing on Heat Stability and Dye Storage Performance of A Double Strength C. I. Disperse Blue 79 Liquid Formulation

| | $CH_2O$/Sulfite or Bisulfite Ratio (Moles per 1,000 grams Lignin) | Final Product pH | Dye Viscosity in cps after 7 Days | Heat Stability (Dye Residue in grams) |
|---|---|---|---|---|
| Prior Art Lignin 1 | 2/3.5 | 6.2 | 300 | 0.0039 |
| Prior Art Lignin 2 | 2/3.5 | 7.4 | 140 | 0.0047 |
| Lignin of the Present Invention | 2/3.5 | 8.8 | 80 | 0.0040 |
| Prior Art Lignin 1 | 2/3.5 | 4.8 | gel (1st day) | 0.0095 |
| Prior Art Lignin 2 | 2/3.5 | 7.9 | 348 | 0.0053 |

TABLE I-continued

The Effect of Reaction pH During Dispersant Processing on Heat Stability and Dye Storage Performance of A Double Strength C. I. Disperse Blue 79 Liquid Formulation

| | CH$_2$O/Sulfite or Bisulfite Ratio (Moles per 1,000 grams Lignin) | Final Product pH | Dye Viscosity in cps after 7 Days | Heat Stability (Dye Residue in grams) |
|---|---|---|---|---|
| Lignin of the Present Invention | 2/3.5 | 9.4 | 140 | 0.0031 |

The data presented in Table I provide a comparison of dye compositions containing lignin dispersants prepared as in the prior art and lignin dispersants prepared as in the present invention. The data show lower comparative viscosities for the dye compositions utilizing the lignin dispersants of the present invention.

The following specific example illustrates the method of preparation of the products of the present invention.

EXAMPLE I

The pH of a 20% water slurry of an "A" lignin (recovered from a kraft black liquor) with an ash content of less than about 1.5% was adjusted with sodium hydroxide to a pH of 10.8–11.1. The pH adjustment required about 2.3 moles (92 pounds) of sodium hydroxide. After heating the lignin solution to about 68.5°–70° C. (155°–158° F.), two moles (60 grams) of formaldehyde are added and the temperature is maintained for two hours to methylolate the lignin. 1.9 moles (122 grams) sulfur dioxide gas is introduced quickly into the slurry resulting in acidification of the slurry to a pH of approximately 5.6. To bring the total reactive sulfur level to 2.9 moles, 1 mole (126 grams) of sodium sulfite is stirred into the reaction mixture to raise the pH to around 6.0–6.3. Upon final pH adjustment to 6.3, the slurry in an autoclave vessel is rapidly heated to 175° C. and the temperature maintained for two hours. Cooling is initiated thereafter and the sulfonated lignin cooled as quickly as possible. The final pH of the product may vary between about 8.4–9.5.

Five "A" lignin by-product samples from black liquors of kraft pulping processes were methylolated and sulfonated, utilizing varying amounts of formaldehyde and sodium sulfite or bisulfite, and at varying conditions of temperature and pH. These sulfonated products were incorporated as dispersants in disperse dyes. The disperse dye compositions containing the lignins were tested for initial viscosity and for viscosity after seven days shelf life. Specifically, dyestuff compositions containing 150 grams C. I. Blue 79 dye, 32 grams lignin dispersant, and 273 grams water were ground to a particle size range below 1 micron, and their viscosity was measured at 40% solids at a pH of 7.5 to 8. Dyestuff compositions containing 100 grams of C. I. Vat Black 25 dye, 41.6 grams of the lignin dispersant, 66.5 grams of glycerin, and 211 grams water were ground to a particle size range of below 1 micron, and the viscosity measured at 26% solids at a pH of 7.5 to 8.

Results of the various tests utilizing the various lignin dispersants are set forth in the following tables.

TABLE II

Comparison of Dyestuff Composition Viscosity with Sulfonated Lignin Dispersants of Varying Sulfite or Bisulfite Content in Sulfonation Step
Methylolation with 2 moles per 1,000 grams Lignin Temperature of sulfonation 175° C.

| Lignin Sample No. | Sulfonation: Moles Sulfite/Bisulfite Compound per 1,000 Grams Lignin | Starting pH | Final pH | Blue 79 Initial | Blue 79 7 Days | Vat Black 25 Initial | Vat Black 25 7 Days |
|---|---|---|---|---|---|---|---|
| 1 | 4.0 | 6.29 | 9.29 | 25 | 165 | 20 | 40 |
| | 3.5 | 6.30 | 9.25 | 20 | 70 | 20 | 20 |
| | 3.1 | 6.30 | 9.23 | 18 | 40 | 15 | 20 |
| | 2.9 | 6.25 | 9.13 | 20 | 35 | 25 | 20 |
| | 2.7 | 6.30 | 8.95 | 20 | 42 | 15 | 17 |
| | 2.5 | 6.32 | 8.86 | 25 | 55 | 20 | 20 |
| | 2.0 | 6.30 | 8.80 | 35 | 360 | 25 | 95 |
| 2 | 3.8 | 6.35 | 9.40 | 20 | 60 | | |
| | 3.5 | 6.30 | 9.30 | 18 | 45 | | |
| | 3.1 | 6.30 | 9.23 | 20 | 44 | | |
| | 2.7 | 6.32 | 9.30 | 20 | 22 | | |
| 3 | 3.5 | 6.23 | 9.15 | 20 | 140 | | |
| | 3.1 | 6.30 | 9.26 | 20 | 80 | | |
| | 2.9 | 6.30 | 9.20 | 19 | 43 | | |
| 4 | 3.5 | 6.28 | 9.30 | 19 | 44 | | |
| | 3.1 | 6.25 | 8.60 | 18 | 38 | | |
| | 2.7 | 6.30 | 8.55 | 20 | 21 | | |
| 5 | 3.1 | 6.05 | 7.00 | 30 | 163 | | |
| | 2.7 | 6.00 | 7.10 | 35 | 230 | | |
| | 2.5 | 6.10 | 6.60 | 40 | 3125 | | |

As can be seen from the data in Table II (Samples 1–4), lignins in which the reactive sulfite or bisulfite content for sulfonation is between about 2.5 to 3.5 moles per 1,000 grams lignin provide dyestuff composition viscosities generally below about 100 cps, even after seven days of shelf storage life. Conversely, if the moles of reactive sulfite or bisulfite for sulfonation are outside these ranges for the C. I. Blue 79 dye composition (first and last runs of Lignin Sample 1), the viscosities are not as low. Similarly, where the final pH of the compositions are not at least about 7.5 or greater (Lignin Sample 5), higher viscosities occur in the dye compositions.

Seven samples of a "A" lignin by-product of a kraft pulping process were methylolated and sulfonated utilizing varying amounts of formaldehyde and sodium sulfite or bisulfite for the methylolation and sulfonation steps, respectively, with sulfonation reaction being carried out at varying conditions of temperature. The samples were employed as a dispersant in a C.I. Disperse Blue 79 dye compositions and viscosities of the dye/dispersant composition measured at the time of initial preparation and after seven days shelf life. Results of these formulations and tests are presented in Table III.

TABLE III

| Moles $CH_2O$ per 1,000 Grams Lignin | Moles Sulfite or Bisulfite per 1,000 Grams Lignin | Starting pH | Final pH | Temp. (°C.) | Viscosity (cps) Blue 79 Initial | 7 Days |
|---|---|---|---|---|---|---|
| 1.7 | 2.9 | 6.30 | 8.60 | 100 | 650 | Gel |
| 2.0 | 2.9 | 6.29 | 8.60 | 100 | 1350 | Gel |
| 2.0 | 3.5 | 6.27 | 8.50 | 140 | 35.0 | 850 |
| 2.0 | 3.5 | 6.30 | 8.65 | 160 | 27.5 | 296 |
| 2.0 | 3.5 | 6.44 | 8.70 | 175 | 25.0 | 45 |
| 2.0 | 3.5 | 6.30 | 8.65 | 180 | 20.0 | 60 |
| 2.0 | 3.5 | 6.35 | 8.75 | 190 | 20.0 | 98 |

From the data presented in Table III, it can be seen that sulfonated lignins prepared at sulfonation reaction temperatures below about 170°, when employed as dispersants in dyestuffs, do not provide extended shelf life viscosities below 100, whereas those in which the temperature is above about 170°, e.g., 175° and greater, provide dyestuff dispersant viscosities below 100 cps after seven days shelf life.

Samples of an "A" lignin by-product of a kraft pulping process were sulfomethylated utilizing varying amounts of formaldehyde in the methylolation step. The samples were then employed as dispersants in a C.I. Disperse Blue 79 dye composition, and the viscosities of the composition measured after initial formulation and after seven days shelf life. The results are presented in Table IV.

TABLE IV 2.9 Moles Sulfite/Bisulfite per 1,000 Grams Lignin
Temperature 175° C.

| Moles $CH_2O$ per 1,000 Grams Lignin | Starting pH | Final pH | Viscosity (cps) Blue 79 Initial | 7 Days |
|---|---|---|---|---|
| 4.0 | 6.20 | 8.90 | 1650 | Gel |
| 3.5 | 6.17 | 8.60 | 590 | Gel |
| 3.0 | 6.22 | 8.55 | 410 | 8900 |
| 2.5 | 6.14 | 8.40 | 75 | 405 |
| 2.0 | 6.20 | 8.36 | 20 | 45 |
| 1.7 | 6.10 | 8.31 | 20 | 18 |
| 1.4 | 6.13 | 8.38 | 16 | 16 |
| 1.1 | 6.14 | 8.32 | 18 | 25 |
| 0.8 | 6.21 | 8.41 | 17 | 32 |
| 0.5 | 6.18 | 8.07 | 20 | 33 |
| 0.2 | 6.19 | 8.02 | 20 | 107 |
| — | 7.28 | 10.01 | 209 | Gel |

(Reaction without $CH_2O$ occurs at Starting pH of 7.28 or above)

From the data presented in Table IV, it can be seen that sulfonated lignins prepared with more than about 2 moles formaldehyde in the methylolation step did not provide the desired low viscosities in dyestuff dispersions, whereas those which use 2 moles or less formaldehyde do provide the desired lower viscosity in the dyestuff dispersions.

Products of the present invention were combined with and employed as a dispersant in carbon black suspensions, and the results of tests conducted thereon with respect to comparisons with other dispersants are listed in Table V.

Carbon black dispersions were prepared utilizing the following formulation:

| 7/2.0 g | Carbon Black |
|---|---|
| 4.4 g | Dispersant |
| 4.3 g | $NH_4OH$ |
| 119.3 g | $H_2O$ - distilled |
| 200.0 g | Total |

TABLE V

| Dispersant | Grinding pH Initial | Final | Final % Solids | Particle Size | Viscosity[a] (cps) Initial | Week 1 | Week 2 | Week 3 | Week 4 |
|---|---|---|---|---|---|---|---|---|---|
| MARASPERSE CB OS/3 (sulfite lignin manufactured by Lignosol Corp. of Canada) | 10.0 | 10.1 | 38.2 | 0.21 | 1420 | 2550 | 2560 | 3100 | 3500 |
| Sulfonated lignin prepared by method of the present invention | 10.0 | 10.0 | 38.2 | 0.22 | 1570 | 2480 | 2930 | 3570 | 3860 |
| Sulfonated lignin prepared by method of the present invention | 7.9 | 7.9 | 38.2 | 0.23 | 1650 | 2260 | 2790 | 3540 | 3650 |

[a]Viscosities-Brookfield, Spindle #2 at 100 rpm.

As can be seen from the Table V, the viscosities of the carbon black/lignin dispersions prepared in accordance with the present invention compared favorably in viscosity at an initial and weekly periods of up to four weeks with Marasperse CB, which is a considered standard in the industry.

That which is claimed is:

1. A carbon black composition comprising carbon black and a sulfonated lignin dispersant prepared by methylolating a lignin material by reaction less than about 2 moles formaldehyde per 1,000 grams of the lignin and sulfonating the methylolated lignin by reaction with from about 2.3 to about 3.5 moles of a sulfite or bisulfite compound per 1,000 grams of the lignin at an initial reaction pH of below about 6.6 and at a temperature of about 170° C., allowing the reaction pH to rise to a final pH greater than 7.5 to sequentially sulfonate both the methylolated aromatic nucleus and a side chain of the lignin.

2. A composition as defined in claim 1 wherein the lignin is methylolated with from about 1.4 to 1.7 moles formaldehyde per 1,000 grams of lignin, and the methylolated lignin is reacted with a composition containing from about 2.7 to 2.9 moles of sulfite or bisulfite compound per 1,000 grams of lignin at a pH of between about 6.1 to 6.3.

3. A composition as defined in claim 1 wherein the final lignin composition has an organically bound sulfur content of greater than about 1.5 moles per 1,000 gram moles of lignin.

4. A composition as defined in claim 2 wherein the lignin is methylolated at a pH of about 11, the pH of the methylolated lignin is lowered to an acid pH by addition of sulfur dioxide, and sodium sulfite or sodium bisulfite is added for the sulfonation reaction.

* * * * *

UNITED STATES PATENT AND TRADEMARK OFFICE
CERTIFICATE OF CORRECTION

PATENT NO.  : 4,892,587
DATED       : January 9, 1990
INVENTOR(S) : Peter Dilling et al.

It is certified that errors appear in the above-identified patent and that said Letters Patent is hereby corrected as shown below:

In column 2, line 11, after "above," insert --100°C, up--.

In column 2, line 11, delete "190.C" and substitute therefor --190°C--.

In column 8, line 14, delete "7/2.0 g" and substitute therefor --72.0 g--.

Signed and Sealed this

Second Day of November, 1993

Attest:

BRUCE LEHMAN

Attesting Officer

Commissioner of Patents and Trademarks